Patented Sept. 15, 1931

1,822,968

UNITED STATES PATENT OFFICE

EDUARD HOLZAPFEL, OTTO BRAUNSDORF, AND HANS LANGE, OF HOCHST-ON-THE-MAIN, GERMANY, ASSIGNORS TO GENERAL ANILINE WORKS, INC., OF NEW YORK, N. Y., A CORPORATION OF DELAWARE

VAT DYESTUFFS OF THE BENZANTHRONE SERIES

No Drawing.  Application filed March 23, 1926. Serial No. 96,871.

The present invention relates to new vat dyestuffs of the benzanthrone series, and to a process of preparing the same.

We have found that benzanthronyl sulfides of the general formula:

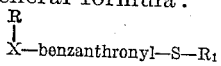

wherein X repesents NH, O or S; R represents H, alkyl, aryl, aralkyl and $R_1$ alkyl, aryl, aralkyl (the term aryl also comprising the anthraquinonyl and benzanthronyl residue, substituted or not) are converted into vat dyestuffs by treating them with alkaline condensing agents.

The compounds to be used as starting material may be obtained by subjecting mono- or poly-halogen-substituted benzanthronyl sulfides to reaction with ammonia, aliphatic or aromatic amines, phenols or mercaptans with splitting off of hydrogen halide. If the reaction is conducted under suitable conditions, there may also be used as starting material the halogen-substituted benzanthronyl mercaptans or benzanthronyl-disulfides, because during the condensation process sulfur or hydrogen sulfide is simultaneously split off and thus the corresponding condensation products of the benzanthronyl sulfides are formed.

Another process for preparing products of the above indicated formula: R. NH.-benzanthrone —S—$R_1$ consists in starting from amino-substituted products of the mercaptans or disulfides or sulfides of benzanthronyl or derivatives thereof and condensing them under appropriate conditions with compounds containing a replaceable halogen.

The following examples serve to illustrate our invention, all parts being by weight:

(1) 50 parts of mono-bromo-benzanthronyl sulfide, which has most probably the formula:

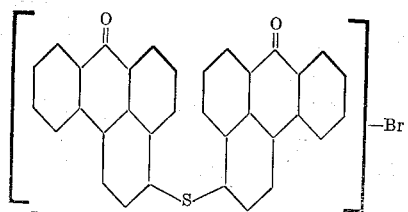

obtained by brominating Bz-1, Bz1'-benzanthronyl sulfide in conc. sulfuric acid—are heated in an autoclave provided with a stirrer for about 20 hours to 170–180° C. with 250 parts of conc. aqueous ammonia and 30–40 parts of copper sulfate. The mono-amino-benzanthronylsulfide which has the probable formula:

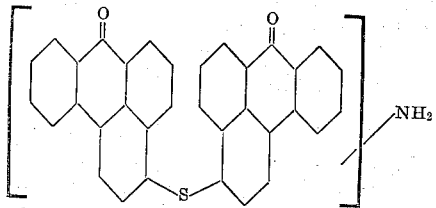

after being freed from the copper salts by means of boiling water, forms a brown powder which dissolves in conc. sulfuric acid to a bluish-green solution. 10 parts of the mono-amino-benzanthronyl sulfide thus obtained are introduced, while stirring, at 130–135° into a melt of 50 parts of caustic potash and 40 parts of ethyl alcohol and the mixture is kept at this temperature until the formation of the dyestuff is complete. The deystuff,—amino-isodi-benzanthrone,—thus obtained has most probably the formula:

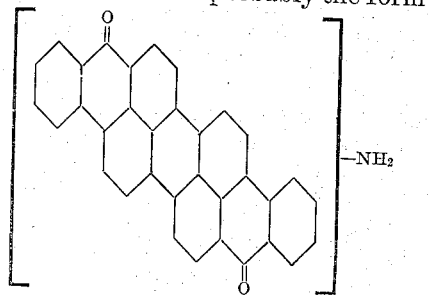

and when isolated in the usual manner, forms a black violet powder which dyes from the hydrosulfite vat cotton violet tints which, when treated with a hypochlorite compound, change to blue tints. It is soluble in conc. sulfuric acid to a green solution.

(2) 30 parts of dibromo-benzanthronyl sulfide — produced by brominating Bz-1, Bz-1'-benzanthronyl sulfide in chlorosulfonic acid—are heated to boiling with 300 parts of anhydrous aniline, 6 parts of calcined sodium carbonate, 6 parts of anhydrous sodium acetate and 2 parts of cuprous chloride until there can no longer be detected any unaltered dibromo-benzanthronyl sulfide. The condensation product is a di-(phenyl-amino)-benzanthronyl sulfide having the probable formula:

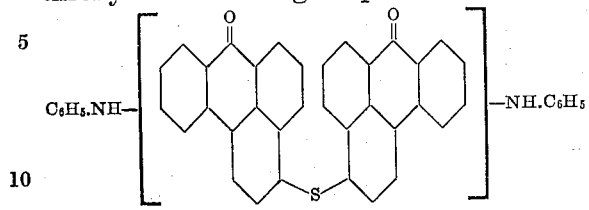

This product, when isolated in the usual manner, forms a yellowish brown powder which dissolves in conc. sulfuric acid to a green solution.

75 parts of potassium hydroxide are introduced, while stirring, into 50 parts of ethyl alcohol and this mixture is heated to 140–145° C. At this temperature are introduced 15 parts of the above described condensation product and the resulting melt is stirred at 145° C. until there can no longer be detected any unaltered starting material. The molten mass is then dissolved in water and the dyestuff is precipitated by passing air into it; it is then filtered by suction and washed with water. The dyestuff, which has most probably the formula:

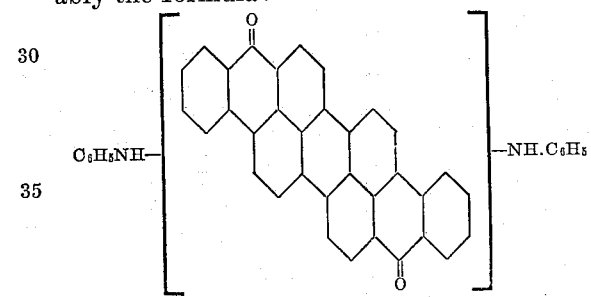

forms a violet black powder which is soluble in conc. sulfuric acid to a green solution and which gives with hydrosulfite a blue vat dyeing cotton an intense violet tint.

(3) 20 parts of mono-bromo-benzanthronylsulfide,—obtained in the way indicated in Example 1,—are heated to boiling with 10 parts of benzamide, 10 parts of calcined sodium carbonate and 0.5 parts of copper powder in 300 parts of nitrobenzene until there can no longer be detected any unaltered starting material. The condensation product having most probably the formula:

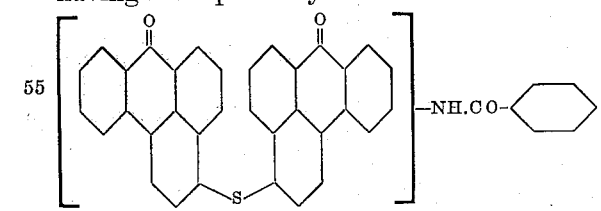

when isolated in the usual manner, forms a brown powder. Its solution in conc. sulfuric acid is of a green color.

One part of this condensation product is fused as indicated in the foregoing examples together with ethyl alcohol and caustic potash. The dyestuff thus obtained forms a black powder which dissolves in conc. sulfuric acid to a green solution. It gives with hydrosulfite a blue vat which dies cotton violet blue tints. When treated with hypochlorite, the dyeing assumes a marine blue color. The dyestuff is a mono-amino-isodibenzanthrone having most probably the formula:

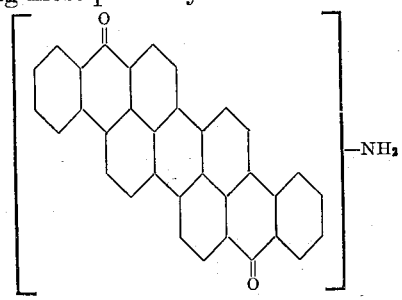

the benzoyl residue having been split off.

(4) 100 parts of mono-bromo-benzanthronyl sulfide—obtained as set forth in Example 1—are heated to boiling for about 14 hours with 75 parts of α-aminoanthraquinone, 25 parts of calcined sodium carbonate and one part of copper powder in 1500 parts of nitrobenzene. The resulting condensation product is filtered off and freed from nitro-benzene and inorganic salts by washing with ethyl alcohol and a stream of water. The product, has the probable formula:

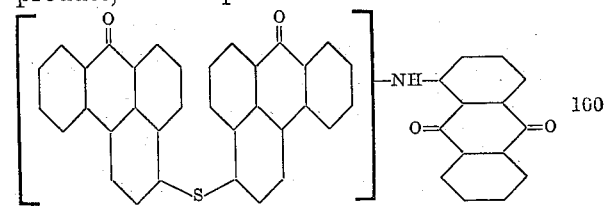

and forms a brown red powder which dissolves in conc. sulfuric acid to an emerald green solution. It yields a reddish brown vat which dies cotton a faint reddish brown tint.

One part of α-anthraquinonyl-aminobenzanthronyl sulfide is fused with 4–5 parts of caustic potash and 3 parts of ethyl alcohol at 160–180° until the formation of the dyestuff is complete. The dyestuff, when isolated in the usual manner, forms a bluish black powder which dissolves in conc. sulfuric acid to a green solution and gives with hydrosulfite a blue vat which dyes cotton marine blue tints. The vat dyestuff has most probably the formula:

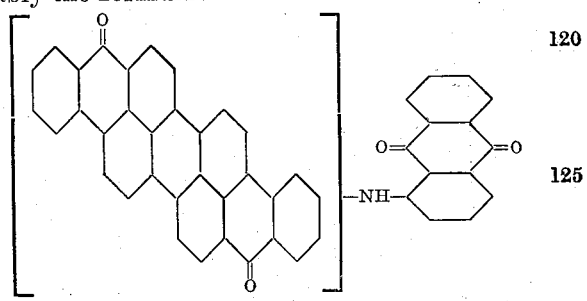

(5) By condensing dibromo-benzanthronyl sulfide—as it is obtainable by brominating Bz-1,Bz-1'-benzanthronyl sulfide in conc. sulfuric acid—with α-aminoanthraquinone according to the indications contained in Example 4, the di-α-anthraquinonyl-amino-benzanthronyl sulfide is obtained as a reddish brown powder. It dissolves in concentrated sulfuric acid to a pure green solution and dyes from a reddish brown hydrosulfite vat cotton a faint reddish brown tint.

One part of di-[α-anthraquinonyl-amino]-benzanthronyl sulfide is fused with 4 parts of caustic potash and 3 parts of ethyl alcohol at 160–180° until there can no longer be detected any unaltered starting material. The dyestuff is isolated in the usual manner and forms a bluish black powder which dissolves in conc. sulfuric acid to a green solution. It yields a bluish black vat which dyes cotton a bluish grey tint. The dyestuff is a di(anthraquinonyl - amino) - isodibenzanthrone having the probable formula:

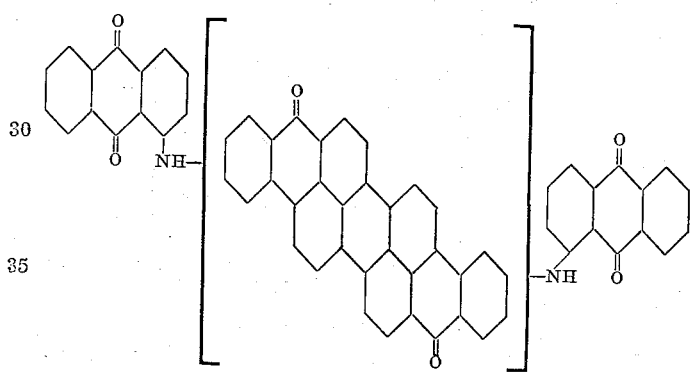

(6) 10 parts of dibromo-benzanthronyl sulfide—obtained by subjecting dibromo benzanthrone to reaction with sodium disulfide—are heated to boiling with 80–100 parts of phenol and 3–5 parts of anhydrous potassium carbonate until there can no longer be detected any unattacked dibromo-benzanthronyl sulfide. The condensation product, after being isolated from the melt and freed from phenol by boiling with diluted caustic soda solution, forms a brown powder which dissolves in conc. sulfuric acid to a green solution. This product is a diphenoxy-benzanthronyl sulfide having the probable formula:

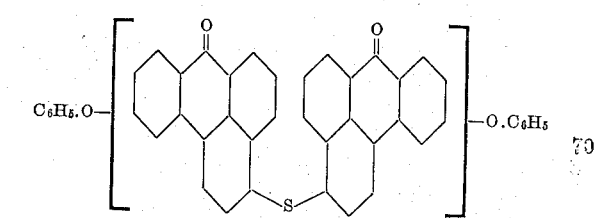

One part of this condensation product is introduced into a melt, heated to 130° C., of 4–5 parts of caustic potash and 4 parts of ethyl alcohol and fused at 130–135° for 1–2 hours. The dyestuff having the probable formula:

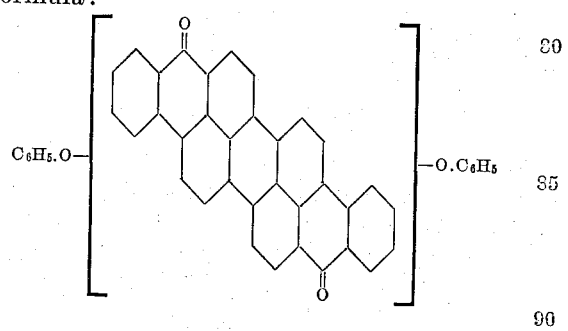

after being isolated in the usual manner, forms a black violet powder which dissolves in conc. sulfuric acid to a green solution and gives with hydrosulfite a blue vat dyeing cotton bluish violet tints.

(7) By condensing dibromo-benzanthronyl sulfide in the manner set forth in the preceding example, with para-thio-cresol, a condensation product is obtained which, when fused with caustic potash and ethyl alcohol, yields a dark blue vat dyestuff, which dissolves in sulfuric acid to a green solution and dyes cotton from a warm hydrosulfite vat bluish violet tints. This vat dyestuff has most probably the formula:

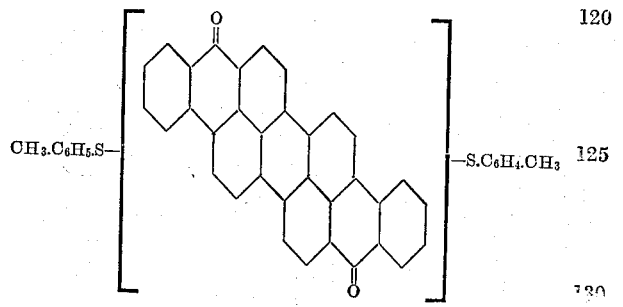

(8) 150 parts of monoamino-Bz-1,Bz-1'-benzanthronyl sulfide (see Example 1) are heated to boiling with 90 parts of α-chloro-anthraquinone, 25 parts of calcined sodium carbonate, 25 parts of anhydrous sodium acetate and one part of copper powder in 2500 parts of nitrobenzene until there can no longer be detected any unattacked starting material. The condensation product after being isolated in the usual manner forms a brownish red powder which dissolves in conc. sulfuric acid to a green solution.

10 parts of the anthroquinonyl-amino-benzanthronyl sulfide thus obtained are introduced at 130° into a melt of 50 parts of caustic potash and 35 parts of alcohol; the temperature is then raised up to 160° and so maintained until the formation of the dyestuff is complete. The dyestuff, after being isolated in the usual manner, is a bluish black powder which dissolves in conc. sulfuric acid to a green solution and gives with hydrosulfite a vat which dyes cotton marine blue tints. The dyestuff is most probably an alpha-anthraquinonyl-amino-isodibenzanthrone of the probable formula:

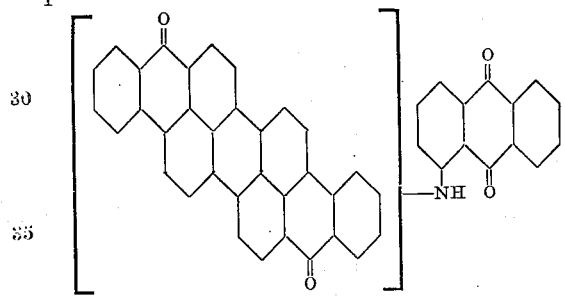

We claim:
1. As new products vat dyestuffs of the benzanthrone series of the following probable formula:

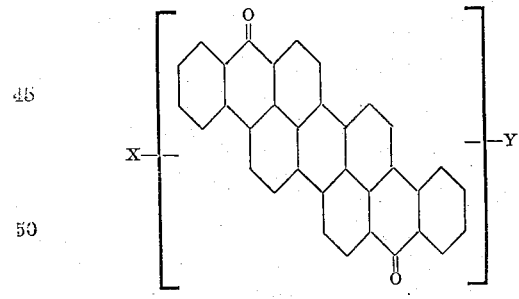

wherein X stands for NH-aryl, O-alkyl, O-aryl, S-alkyl, S-aryl and Y stands for hydrogen or X.

2. As new products vat dyestuffs of the benzanthrone series of the following probable formula:

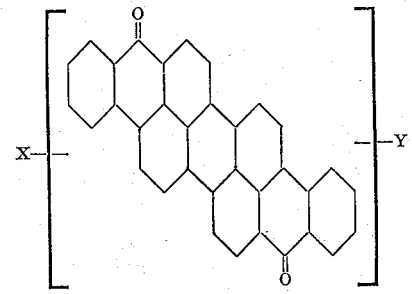

wherein X stands for NH-aryl, O-aryl, S-aryl and Y stands for hydrogen or X.

3. As new products vat dyestuffs of the benzanthrone series of the following probable formula:

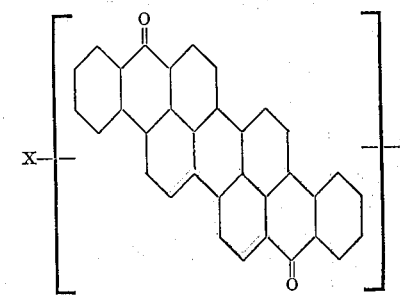

wherein X stands for NH-aryl, O-aryl, S-aryl and Y stands for X.

4. As new products vat dyestuffs of the benzanthrone series of the following probable formula:

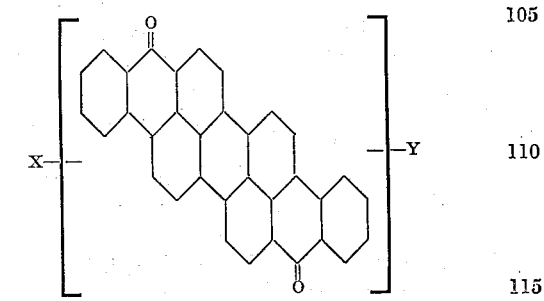

wherein both X and Y stand for NH-aryl.

5. As a new product the bluish gray vat dyestuff of the formula:

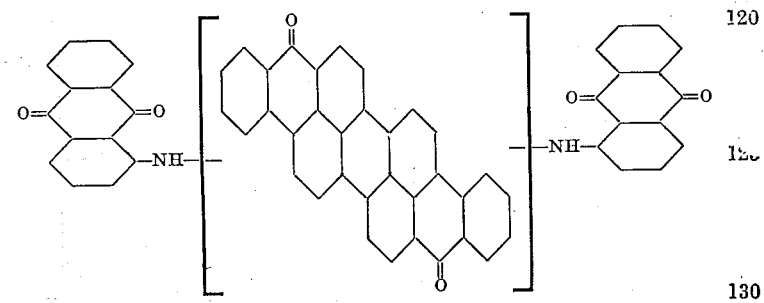

said dyestuff being a bluish black powder, soluble in concentrated sulfuric acid to a green solution and yielding a bluish black vat from which cotton is dyed a bluish gray tint.

In testimony whereof, we affix our signatures.

EDUARD HOLZAPFEL.
OTTO BRAUNSDORF.
HANS LANGE.